No. 633,848. Patented Sept. 26, 1899.
A. A. JOHNSSON.
PNEUMATIC TIRE.
(Application filed Jan. 21, 1899.)
(No Model.)
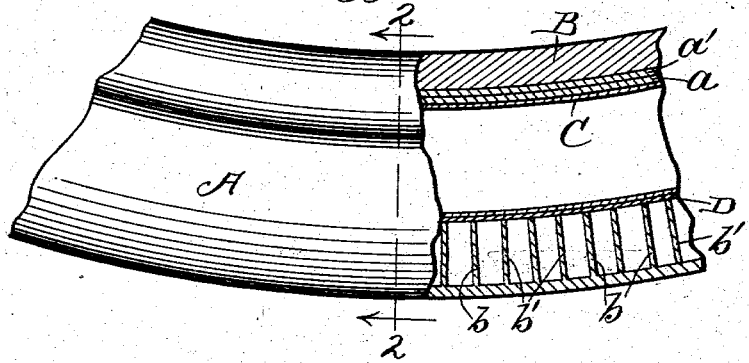
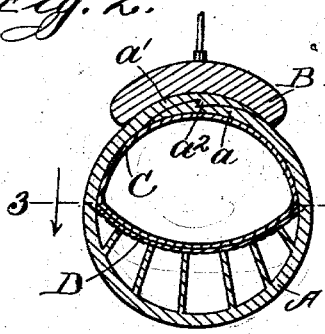
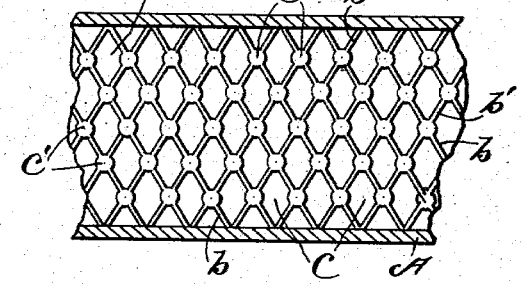
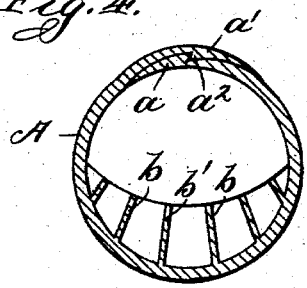
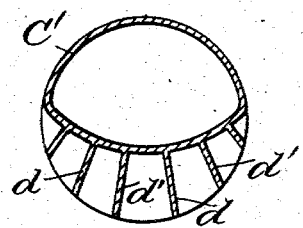
Witnesses:
W. J. Jacker.
E. A. Duggan.
Inventor:
Axel A. Johnsson
By Chas. C. Tillman
Atty

UNITED STATES PATENT OFFICE.

AXEL A. JOHNSSON, OF CHICAGO, ILLINOIS.

PNEUMATIC TIRE.

SPECIFICATION forming part of Letters Patent No. 633,848, dated September 26, 1899.

Application filed January 21, 1899. Serial No. 702,892. (No model.)

*To all whom it may concern:*

Be it known that I, AXEL A. JOHNSSON, a subject of the King of Sweden and Norway, residing at Chicago, in the county of Cook and State of Illinois, have invented certain new and useful Improvements in Pneumatic Tires, of which the following is a specification.

This invention relates to pneumatic tires designed for use on bicycles and other vehicles; and it consists in certain peculiarities of the construction, novel arrangement, and operation of the parts thereof, as will be hereinafter more fully set forth and specifically claimed.

In order to enable others skilled in the art to which my invention pertains to make and use the same, I will now proceed to describe it, referring to the accompanying drawings, in which—

Figure 1 is a view, partly in side elevation and partly in longitudinal section, of a portion of a tire embodying my invention, showing it secured to a portion of the rim of a wheel. Fig. 2 is a cross-sectional view taken on line 2 2 of Fig. 1. Fig. 3 is a longitudinal sectional view taken on line 3 3 of Fig. 2. Fig. 4 is a cross-sectional view of the outer tube with the inner tube removed, and Fig. 5 is a cross-sectional view of a modification in the construction of the inner tube.

Similar letters refer to like parts throughout the different views of the drawings.

A represents the outer tube, which is preferably formed at it inner periphery or that portion thereof adjacent to the rim B of the vehicle-wheel with flaps $a$ and $a'$, which are provided with interlocking projections $a^2$, so that when the flaps are brought together and the tire is inflated they will be securely united, yet can be readily separated, when desired, so as to insert the inner tube C, which may be of the ordinary or any preferred construction. Each flap is in section preferably of the shape of half of an arrow-head—that is to say, its projection $a^2$ is about of the same thickness as the top of the tube, which body is beveled on the upper face toward said projection, and the same face is again beveled from the corner of the projection to the edge of the flap. Hence where the projections interlock the combined thickness of the two flaps is somewhat greater than that of the body of the outer tube A at other points, and this I consider preferable, because there is considerable strain on the inner periphery of this tube. The inner surface of the tread or outer portion of the outer tube A is provided with a series of ribs $b$ and $b'$, which preferably extend diagonally across the tube and intersect each other, thus forming a series of cells or recesses $c$, which are substantially diamond-shaped in plan view. (See Fig. 3.) At their intersection the ribs are provided with enlargements $c'$, which serve to support the ribs in an upright position and also afford a more rigid support for the inner tube. By reference to Figs. 2 and 4 of the drawings it will be seen that the ribs at the sides of the outer tube are shorter than those intervening, so as to form a curved seat on which the inner tube may rest. Located on the inner or free edges of the ribs $b$ and $b'$ and the enlargements $c'$ is a piece D, of canvas or other suitable material, which is interposed between the cellular cushion formed by the ribs $b$ and $b'$ and the inner tube C for the purpose of rendering the same less liable to puncture by means of any instrument which might pierce the outer tube.

Instead of forming the outer tube with the cellular or honeycomb-like cushion, as above described, I may provide an inner tube C', with ribs $d$ and $d'$, (see Fig. 5,) which intersect each other diagonally, similar to the ribs $b$ $b'$ shown in the construction illustrated in Fig. 3, or otherwise on its outer periphery, thus attaining the same result as if the cellular cushion was formed on the outer tube, the principal object being to interpose between the tread portion of the two tubes a cushion composed of a series of cells or recesses.

It will be observed that whether the tubes are on the outer tube projecting inward or on the inner tube projecting outward they are not truly radial to the tire. I form them by preference on lines radiating from the center of the rim B, and this I consider of advantage, because no matter whether the wheel is upright, as in ordinary riding, or is inclined, as in turning corners, certain of the ribs always receive the direct thrust of the weight longitudinally of their lengths. By preference I terminate the ribs at their inner edges (see Figs. 4 and 5) on a transverse curved line on the arc of a circle having a greater radius than that of the tire, and this leaves the inner and inflatable tube truly circular at its inner side to correspond with the curvature of the outer tube, but curved at its outer side to correspond with said arc. The advantage of this construction is that the tubes are less likely to "grip" one on the other, and it is almost utterly impossible for one to turn within the other.

While I have shown the ribs comprising the cellular cushion as extending diagonally across the tube and prefer to so use them, for the reason that they are thereby less liable to be collapsed or bent over, yet I do not desire to be limited to said arrangement, as I may form them so as to intersect each other at right angles or otherwise without departing from the spirit of my invention.

The cells of the cushion formed by ribs of either character above described are closed at one end and open at the other. In Fig. 2 their inner ends are open, although they are covered by the canvas strip D. In Fig. 5 their outer ends are open, though covered by the outer tube A. I am aware that it is old to make a cellular cushion whereby the cells extend lengthwise of the tire and in some cases also transversely thereto and radial to the wheel; but when the cells are closed, so as to form air-pockets for the purpose of preventing punctures, great difficulty in the manufacture is experienced. This is avoided by having one end of the cells open. If on the inner tube, they can easily be molded. If in the outer tube, they can also be easily molded, provided the same is formed with the flaps above described, and which of course lie open during the process of molding. Therefore the advantage resulting from the combined use of the open-ended cells and the separable flaps is apparent.

By forming the outer tube with the flaps $a$ and $a'$, having the interlocking projections $a^2$, which flaps may extend entirely around the outer tube or a part of the way only, it is apparent that the outer flap $a'$ may be secured to the rim B of the wheel by means of cement or otherwise and that the other flap will engage therewith by reason of the pressure of the air within the tube, thus affording a means by which the inner tube may be inserted or removed without entirely removing the outer tube from the wheel-rim. It is also apparent that by constructing the inner tube as shown in the modification illustrated in Fig. 5 it may be used with a plain outer tube of any desired construction.

While I have shown the outer tube provided with the interlocking flaps $a$ and $a'$, yet I do not desire to be limited to such construction, as other means for opening the outer tube for the insertion of the inner one and for securing the parts together may be employed.

Having thus fully described my invention, what I claim as new, and desire to secure by Letters Patent, is—

In a pneumatic tire, the combination with the outer tube having separate flaps at its rim side and means for attaching them, and within its body at its tread side a series or network of intersecting ribs integral with the tread and forming individual cells closed at their outer ends but open at their inner ends, the latter standing in the arc of a circle of a larger radius than that of the tire; of an inner tube filling the outer tube laterally and resting against the rim side thereof and having a flattened outer side next said arc, as and for the purpose set forth.

AXEL A. JOHNSSON.

Witnesses:
 CHAS. C. TILLMAN,
 E. A. DUGGAN.